United States Patent [19]
Chiou

[11] Patent Number: 5,949,818
[45] Date of Patent: Sep. 7, 1999

[54] EXPANDABLE ETHERNET NETWORK REPEATER UNIT

[75] Inventor: Bin-chi Chiou, Hsinchu, Taiwan

[73] Assignee: Winbond Electronics Corp., Taiwan

[21] Appl. No.: 08/919,010

[22] Filed: Aug. 27, 1997

[51] Int. Cl.⁶ .................................................. H04B 3/36
[52] U.S. Cl. ............................................................ 375/211
[58] Field of Search .................................... 375/211, 212, 375/219; 370/445, 401, 246

[56] References Cited

U.S. PATENT DOCUMENTS

| | | | |
|---|---|---|---|
| 5,265,123 | 11/1993 | Vijeh et al. ................................ | 375/211 |
| 5,430,762 | 7/1995 | Vijeh et al. ................................ | 375/211 |
| 5,517,520 | 5/1996 | Chiou ........................................ | 375/212 |
| 5,550,803 | 8/1996 | Crayford et al. ......................... | 370/246 |
| 5,606,664 | 2/1997 | Brown et al. ............................. | 370/407 |
| 5,754,540 | 5/1998 | Liu et al. .................................. | 375/211 |

*Primary Examiner*—Tesfaldet Bocure
*Attorney, Agent, or Firm*—Proskauer Rose LLP

[57] ABSTRACT

An expandable repeater includes N repeater units connected to an integrator device in a star topology. Each of the N repeater units has an input/output ("I/O") port for exchanging clock, data, and status signals. The status signals indicate the data repetition status of the repeater unit to the integrator. The integrator has N I/O interfaces (where N is the number of repeater units to be combined by the integrator), each of which couples to a corresponding I/O port of a repeater unit. The integrator selectively executes the data and clock repetition, and provides a global network status signal in response to the status signals received from all of the repeater units connected to the integrator.

17 Claims, 12 Drawing Sheets

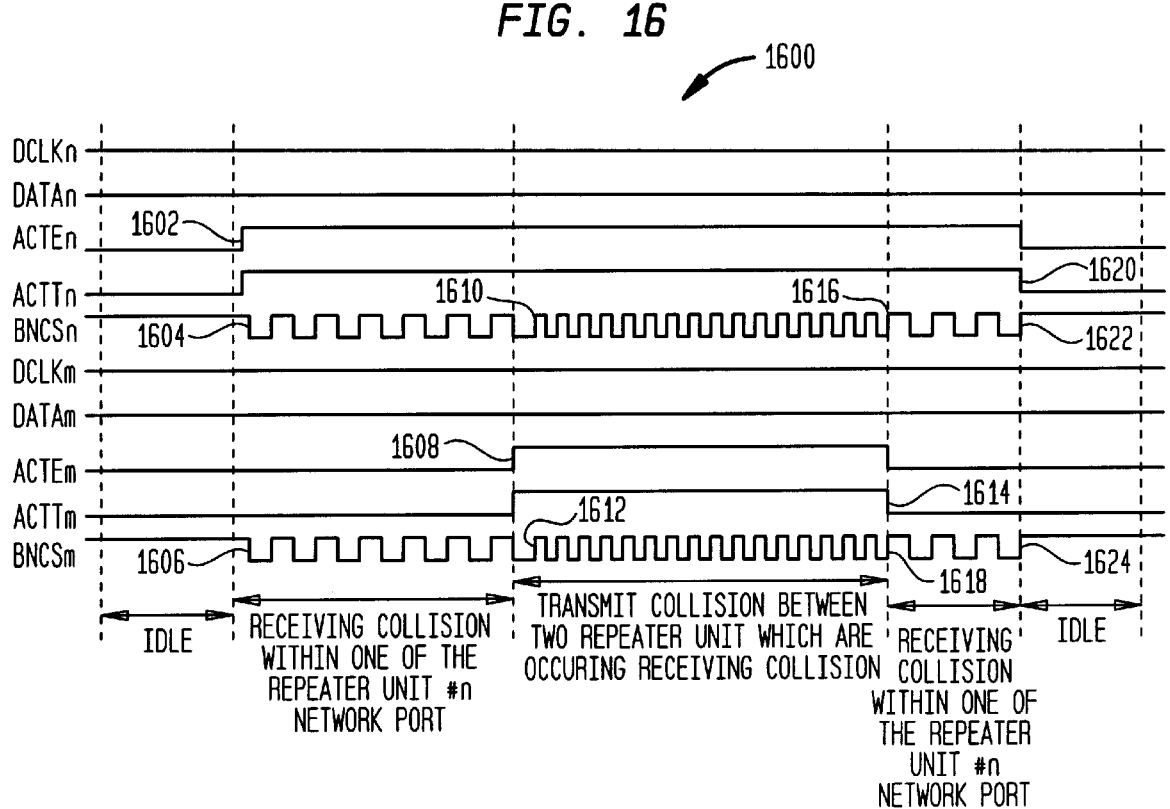
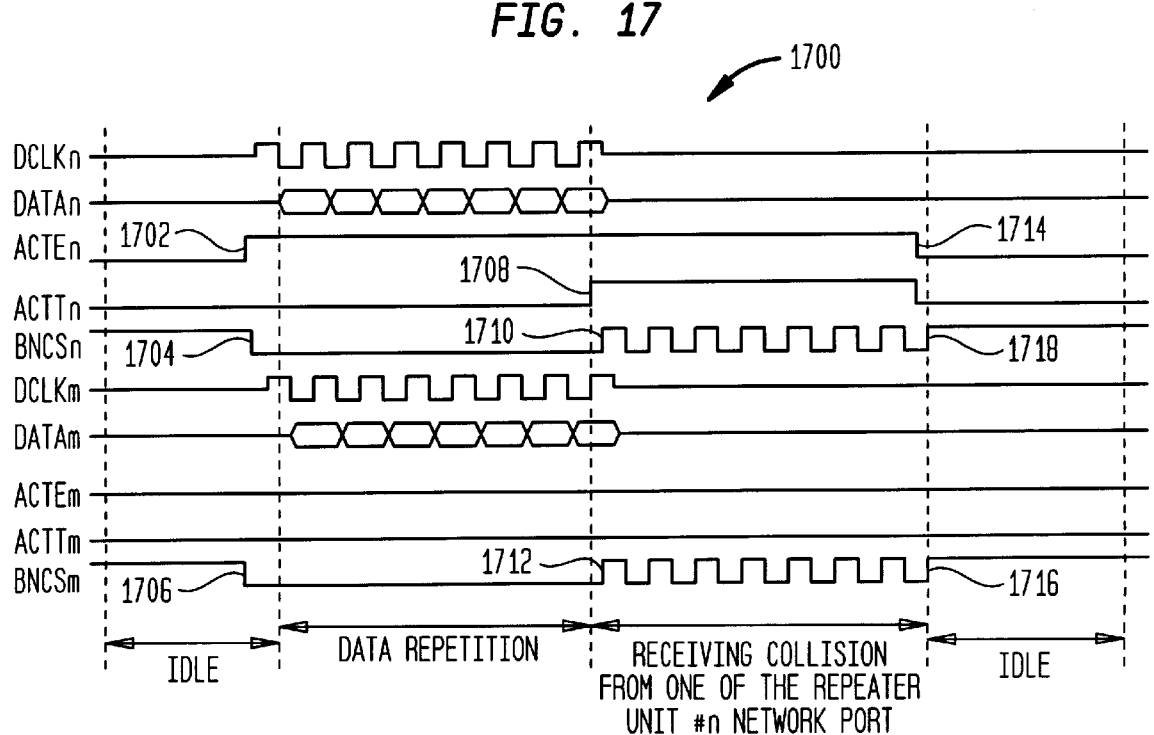

EXPANDABLE ETHERNET NETWORK REPEATER UNIT

RELATED PATENTS AND PATENT APPLICATIONS

The following related patent and patent applications are owned by the assignee of this patent application:

(1) U.S. Pat. No. 5,517,520 entitled "Expandable Repeater" and issued on May 14, 1996 to Bin-Chi Chiou;

(2) U.S. patent application Ser. No. 08/947,179, entitled "Infinitely Expandable Ethernet Network Repeater Unit", filed on Oct. 8, 1997; and (3) U.S. patent application Ser. No. 08/951,874, entitled "Expandable Ethernet Network Repeater", filed on Oct. 17, 1997.

The contents of these patent and patent applications are incorporated herein by reference.

BACKGROUND OF THE INVENTION

1. Field of the Invention

The present invention relates to computer networks and, more particularly, to a repeater unit for use in a Local Area Network operating according to the IEEE 802.3 Standard (an Ethernet network) and which may be expandable to have additional ports, yet operates as a single repeater as defined by IEEE 802.3.

2. Discussion of Related Art

Local Area Networks (LAN) are computer networks which allow a number of data terminal equipment (DTE) to share resources and communicate with each other, thus greatly expanding the usefulness of each DTE. Many types of LANs are known. One common LAN type is a Carrier Sense, Multiple Access Collision Detection (CSMA/CD) network, defined by the IEEE 802.3 Standard and commonly referred to as an Ethernet network. (Ethernet is a registered trademark of the XEROX corporation.) The contents of the IEEE 802.3 Standard are incorporated herein by reference.

Briefly, an Ethernet network operates in the following manner. As seen in FIG. 1, an Ethernet network 100 may include a number of DTEs 102 each connected to a port 103 of a central hub or repeater 104. The DTEs and hub are arranged in a star topology. When a DTE 102 wishes to transmit data to other DTEs on the network, the DTE waits for a quiet period on the network, and then sends the intended message to the repeater 104 in bit-serial form. The repeater 104 then repeats the message to all of the DTEs connected to it. If, after initiating a transmission, another DTE also attempts to transmit a message at the same time, a "collision" is detected. If a collision is detected, then both transmitting stations send a few additional bytes to ensure propagation of the collision throughout the network. The transmitted messages are discarded. The DTEs that attempted to transmit remain silent for a random time ("back-off") before attempting to transmit again. Because each DTE 102 selects its back-off time independently of the other DTEs, a second collision may be avoided.

As seen in FIG. 2, a number of repeaters 104 may be connected to create a series 200 of connected hubs or repeaters. To meet IEEE 802.3 timing requirements, the maximum number of repeaters 104 in any series (from any DTE to any other DTE) is four. Moreover, the star topology allows only one DTE to be connected to each port. Limited port availability on repeaters 104 limits the number of DTEs 102 which may connect to a repeater. The limited number of repeaters in any Ethernet series limits the number of DTEs 102 which may be included in a single Ethernet network series (called a collision domain). If each repeater, for example, has eight ports, only 32 DTEs may be connected to a single collision domain. (Note that FIG. 2 shows a collision domain having 26 DTEs.)

A typical repeater comprises a single integrated circuit chip. Because an IC chip has limited drive current, each chip has a limited number of ports. Thus, each repeater is limited to a number of ports, thus limiting the total number of DTEs which may be connected to a single collision domain. Thus, it is desirable to have repeater units which may be expanded to have additional ports.

Expandable repeaters are known. For example, an expandable repeater is described in U.S. Pat. No. 5,265,123 issued on Nov. 23, 1993 to Vijeh, et al. The contents of this document are incorporated herein by reference. Vijeh, et al. disclose an expandable repeater which connects each repeater unit to an expansion bus. For a repeater unit to transmit on the expansion bus, it must seek permission to do so. An arbiter receives request signals for repeater units seeking to transmit onto the bus, determines which repeater unit may control the expansion bus, issues an acknowledgement signal to that repeater unit, and precludes other repeater units from simultaneously controlling the bus.

U.S. Pat. No. 5,517,520, described above, discloses an expandable repeater in which a number of repeater units are connected in a star topology to an integrator unit. Each repeater unit has an input/output for providing clock, data, control, and collision information to the integrator. A repeater unit issues a request-for-access signal when it wants to transmit to the integrator unit.

It is an object of the present invention to provide an expandable repeater which does not use request or acknowledge signals.

SUMMARY OF THE INVENTION

This and other objects of the present invention are provided by a repeater comprising two or more repeater units. The repeater units are connected to an integrator device which coordinates the repeater units to function as a single repeater according to the IEEE 802.3 Standard.

In a preferred embodiment of the present invention, an expandable repeater includes N repeater units connected to an integrator device in a star topology. Each of the N repeater units has an input/output ("I/O") port for exchanging clock, data, and status signals. The status signals indicate to the integrator whether the repeater unit is transmitting data, ready to receive data, or detecting a collision. The integrator has N I/O interfaces (where N is the number of repeater units to be combined by the integrator), each of which couples to a corresponding I/O port of a repeater unit. The integrator selectively executes the data and clock repetition, and provides a global network status signal in response to the status signals received from all of the repeater units connected to the integrator.

The expandable repeater unit permits a number of repeater units to be combined to operate as a single repeater, thus increasing the number of DTEs which may be connected to a single Ethernet collision domain. Also, the repeater operates without repeater units requesting access to transmit and does not need to receive an acknowledgment signal before transmitting data to the network.

BRIEF DESCRIPTION OF THE DRAWINGS

The present invention is described with reference to the following figures:

FIGS. 12–17 are timing diagrams illustrating the operation of a preferred embodiment of the present invention.

DETAILED DESCRIPTION OF PREFERRED EMBODIMENTS

The invention is described in the following sections:

I. An overview of the structure and function of a preferred embodiment of an expandable repeater according to the present invention is provided with reference to FIGS. 3–5.
II. A repeater unit and repeater unit input/output (I/O) are described with references to FIGS. 6A and 6B.
III. An integrator unit, including an interface, a data flow controller, a status decoder, a data handler, and a network status monitor, is described with reference to FIGS. 7–11.
IV. Timing diagrams illustrating operation of a preferred embodiment of the present invention are described with reference to FIGS. 12–17.
V. A conclusion is provided.

I. Overview of the Invention

A. Structural Overview

Figure 1:
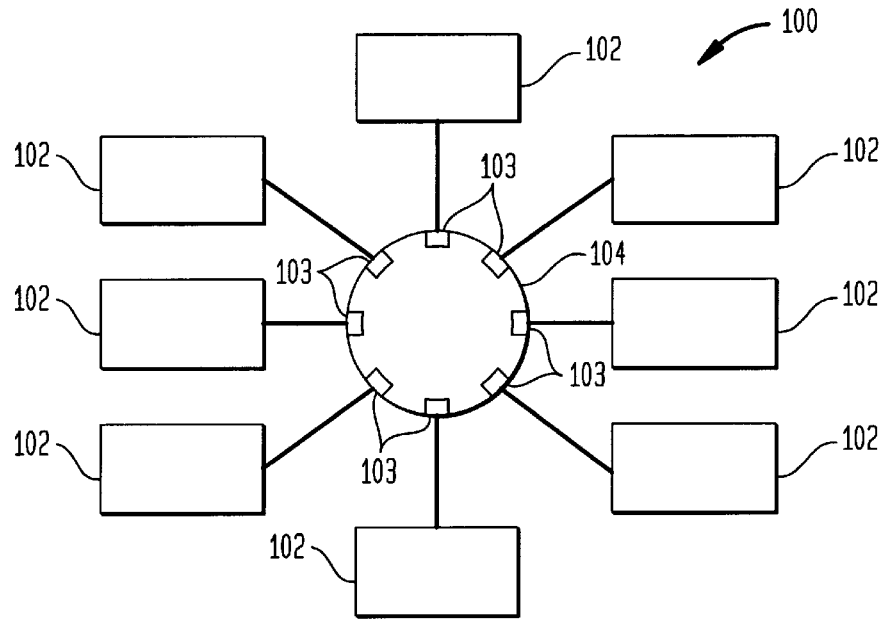
FIG. 1 is a block diagram of a typical Ethernet network having a single repeater.
Figure 2:
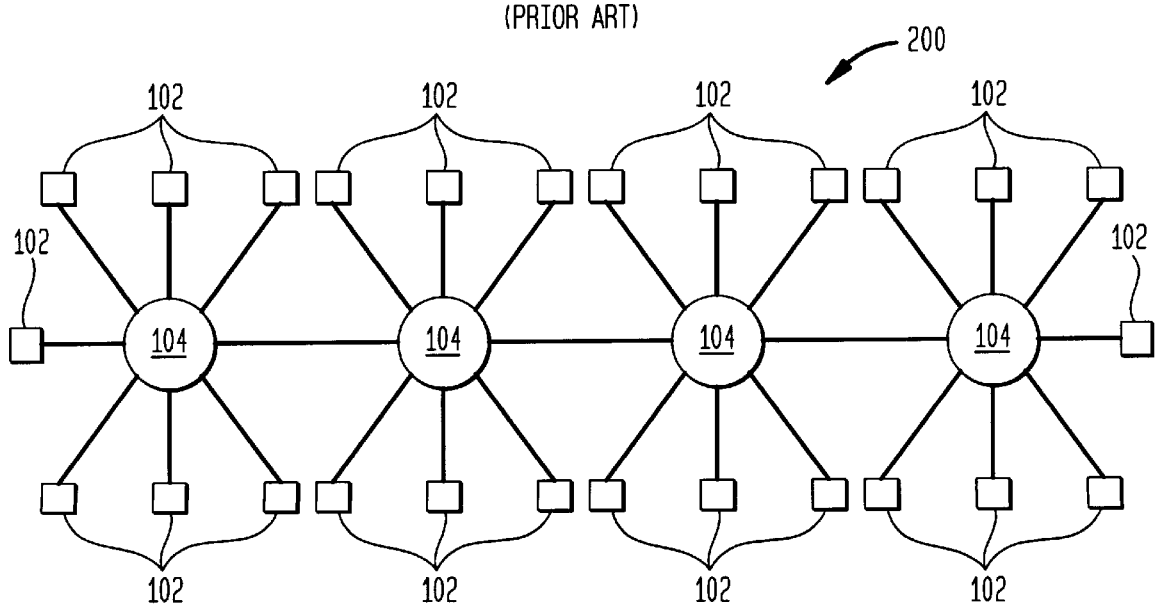
FIG. 2 is a block diagram of an Ethernet network collision domain consisting of a series of four repeaters.
Figure 3:
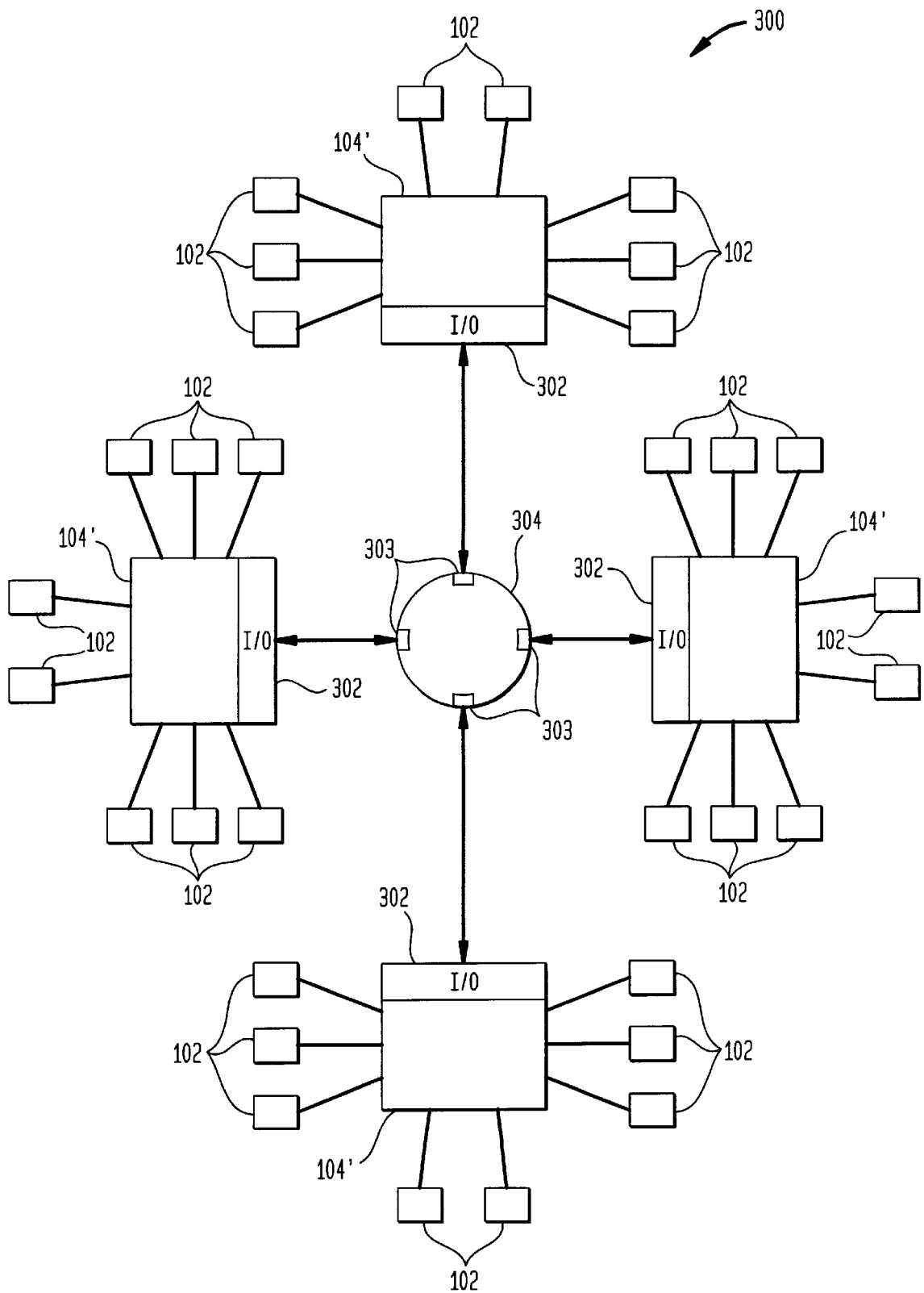
FIG. 3 is a block diagram of a repeater having expandable repeater units according to a preferred embodiment of the present invention.

FIG. 3 is a block diagram of a preferred embodiment of an expandable repeater 300 according to the present invention. The repeater comprises a number of repeater units 104', each repeater unit being connected to a number of DTEs 102. The repeater units 104' each have an I/O 302 which connects to ports 303 in an integrator 304. The I/O 302 transmits a timing clock signal, a data signal, and status signals to the integrator, and receives data, clock, and status signals from the integrator. This exchange of data, clock, and status signals permits a number of repeaters to be connected to the integrator in a manner which permits them to operate as a single repeater.

Figure 4:
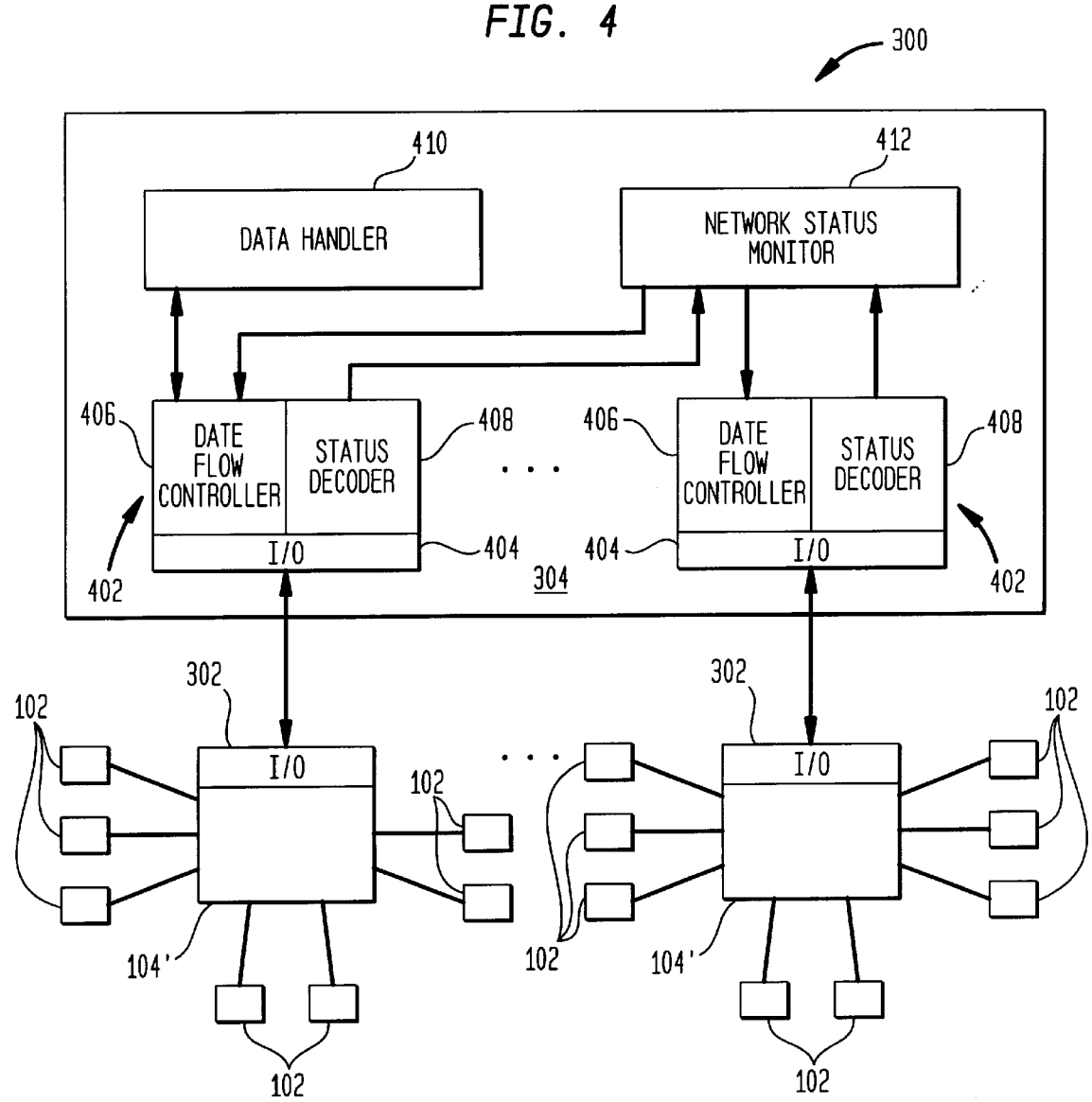
FIG. 4 is a more detailed block diagram of the repeater of FIG. 3.

FIG. 4 is a more detailed block diagram of the expandable repeater 300 of FIG. 3. As seen in FIG. 4, each repeater unit I/O 302 is connected to a repeater unit/integrator interface 402. Each interface 402 comprises an interface I/O 404, a data flow controller 406, and a status decoder 408. All of the interfaces 402 are connected to a data handler 410 and a network status monitor 412. Each data flow controller 406 is in bidirectional communication with the data handler 410. Each status decoder 408 provides repeater unit status information to the network status monitor 412. In response to the status information received from each status decoder, the network status monitor 412 generates a network status signal which is provided to each data flow controller 406.

Figure 5:
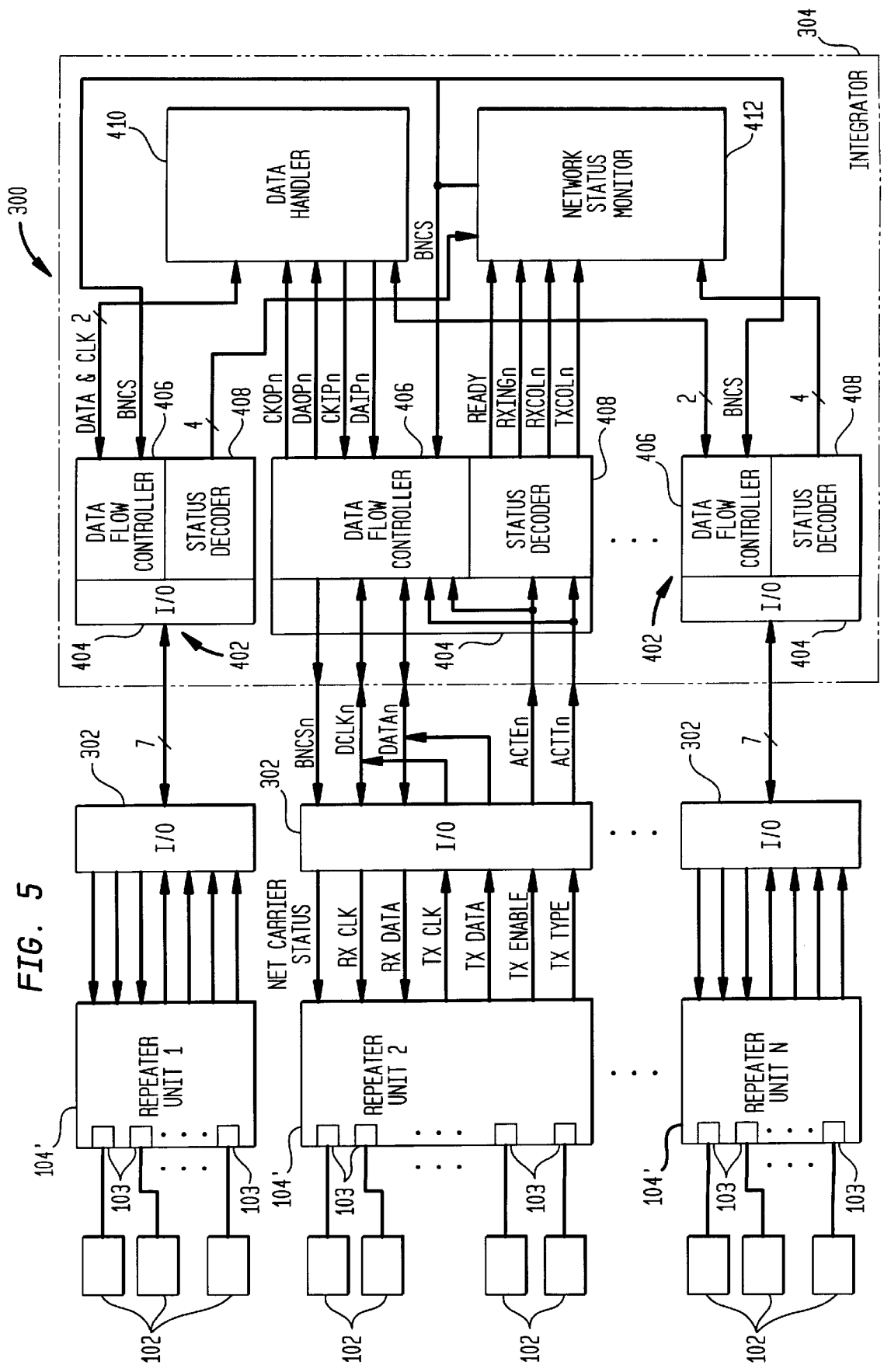
FIG. 5 is an even more detailed block diagram of the repeater of FIG. 3.

FIG. 5 is an even more detailed block diagram of an expandable repeater 300 according to the present invention. FIG. 5 shows N repeater units 104' connected to an integrator 304. Each repeater unit 104' has a number of ports 103, each of which is connected to a DTE 102. Each repeater unit 104' has an I/O 302. The I/O exchanges data (TX DATA, RX DATA), timing (TX CLK, RX CLK) and status information (NET CARRIER STATUS, TX ENABLE, TX TYPE) between the repeater unit 104' and the I/O 302. The I/O 302 also exchanges data (DATAn), timing (DCLKn), and status information (ACTEn, ACTTn, BNCSn) between I/O 302 and the interface 402. (Note that "n" indicates that the signal relates to a particular repeater unit n, where n=1, 2, ... N.)

The repeater unit/integrator interface 402 has an interface I/O 404 which exchanges information with the repeater unit I/O 302 as described above and provides to the data flow controller 406 data (DATAn), timing (DCLKn), and status information (ACTEn, ACTTn) and provides to the status decoder 408 status information (ACTEn, ACTTn). The interface I/O 404 receives information from the data flow controller 402 (BNCSn, DCLKn, DATAn), which information is transmitted to the repeater I/O 302.

The status decoder 408 decodes the status information received from the repeater unit connected to it and provides to the network status monitor 412 a status signal (READYn, RXINGn, RXCOLn, TXCOLn) indicating the status of that repeater unit. The network status monitor 412, in response to each repeater unit's status, generates a global network status signal (BNCS). This signal is fed back to the data flow controllers 406 and transmitted to the repeater units 104'.

The data flow controller 406 exchanges clock information and data with the data handler 410. Each data flow controller 406 also receives the global network status signal (BNCS) from the network status monitor 412.

Each of the repeater components and the signals exchanged between these components is described in more detail below.

B. Functional Overview

The network status monitor 412 receives repeater unit status signals (READYn, RXINGn, RXCOLn, TXCOLn) for each repeater unit. Using these status signals, the network status monitor generates a broadcast network carrier signal (BNCS). The BNCS is provided to each repeater unit 104'. If the BNCS indicates that the network is in the ready state, a DTE 102 may transmit information to the repeater unit 104' to which it is connected (for example repeater unit 1). This transmission places repeater unit 1 in a receive state. This status change is detected by the network status monitor 412 which changes the global status to a receive state. This alerts all repeater units that a transmission is coming. The data and clock lines from repeater unit 1 104' to the interface 402 connected to data repeater 1 to the data handler 410 become output lines providing data and timing information to be repeated to the other repeater units and ultimately to the other DTEs. (Repeater unit 1 also repeats the data and timing information to the DTEs connected to it.) The data and clock lines for the other repeater units become input lines for repeating the data transmitted by repeater unit 1.

If during the transmission from repeater unit 1 another DTE 102 attempts to send a transmission, a collision is detected. The network status monitor detects the collision and changes the global network status to a collision state. This alerts all of the repeater units to discard the received data and the collision is handled in a conventional manner pursuant to IEEE 802.3.

II. The Repeater Unit & The Repeater Unit I/O

Each of the N repeater units 104' is preferably a monolithic integrated circuit which primarily performs state machine functions required by the IEEE 802.3 Standard. These functions are well known and are not further described.

The repeater unit I/O 302 connects the repeater units 104' to the integrator 304. Thus, the I/O 302 exchanges information between the repeater unit 104' and the integrator 304.

Figure 6A:
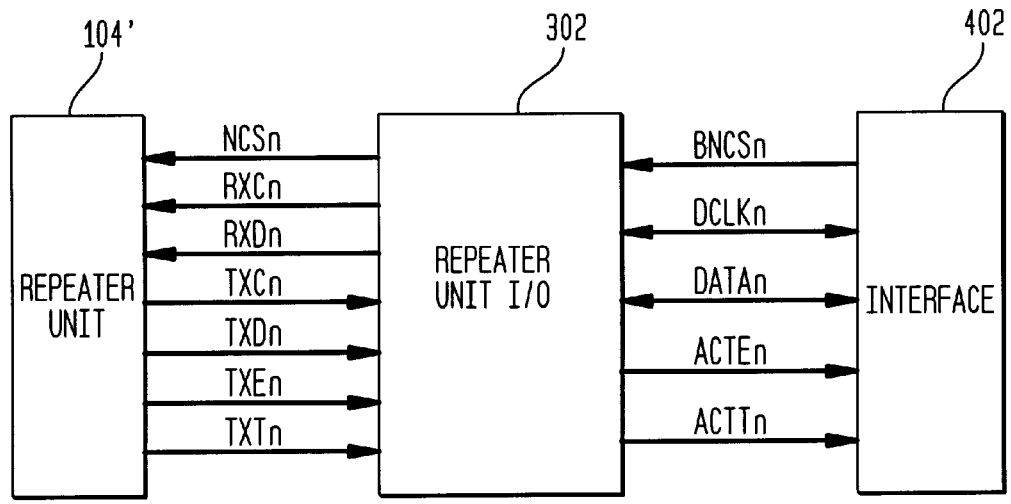
FIG. 6A is a block diagram of a preferred embodiment of a repeater unit I/O.

FIG. 6A is a block diagram of a repeater unit I/O 302 and show signals exchanged between the I/O 302 and the repeater unit 104' and the I/O and the repeater unit/integrator interface 402. The I/O 302 receives the following signals from the repeater unit 104':

TXCn: transmit data clock of repeater unit n
TXDn: transmit data of repeater unit n
TXEn: transmit data enable of repeater unit n
TXTn: transmit data type of repeater unit n These signals are data (TXD) and timing information (TXC) received from a DTE 102 connected to the repeater unit to be repeated to other repeater units, and repeater unit status information (TXE, TXT).

The repeater unit I/O 302 sends to the repeater unit 104' the following signals:

NCSn: network carrier status from the integrator 304
RXCn: receive data clock from the integrator 304
RXDn: receive data from the integrator 304

These are data (RXD) and timing information (RXC) received from the integrator to be repeated to the DTEs 102 connected to the repeater unit, and the network status (NCS).

Bidirectional lines which are selectively input or output (as discussed in detail below) are:

DCLKn: data clock
DATAn: data

The DCLKn and DATAn lines are bidirectional. When the Nth repeater unit is in the READY state (described below), it may receive data and clock information on the DATAn and DCLKn lines from the integrator 304, via the interface 402, to repeat to the DTEs 102 connected to it. When the Nth repeater unit 104' is transmitting data received from a DTE 102 connected to it, the repeater unit 104' outputs data and clock information on the DCLKn and DATAn lines.

DATAn is a data signal synchronized with DCLKn. The clock on DCLKn is used to latch the data on DATAn when the Nth data repeater unit 104' is repeating data received from the integrator 304 connected to it and is used to repeat the DATAn sent from the integrator 304. The latched data may be buffered into an internal FIFO memory of the Nth data repeater unit 104' for transmitting to the DTEs 102 connected to it. The DCLKn received by a repeater unit 104' need not be synchronized with the repeater unit receiving the data, but should be synchronized with the operation clock of the repeater unit 104' which is transmitting the data to the integrator 304. Thus, DATAn may be transmitted asynchronously to the repeater units 104'. Note that the frequency of the clock DCLKn is the data rate of the data on DATAn.

The repeater unit I/O 302 sends the following signals to the repeater unit/integrator interface 402:

ACTEn: activity enable for repeater unit n
ACTTn: activity type for repeater unit n These are activity status indication signals for the Nth data repeater unit 104'. ACTEn is a repeater "activity enable" signal and ACTTn is a repeater "activity type" signal. These two signals provide four types of activity status of the Nth data repeater unit. The four types of status activity are (1) ready to receive data (READY), (2) receiving data (RXING), (3) detecting a receive collision (RXCOL), and (4) detecting a transmit collision (TXCOL). When the Nth data repeater unit is in the READY state, the repeater unit 104' is ready to receive and repeat data receives from its I/O 302, and no collision has occurred. When the Nth data repeater unit 104' is in the RXING state, it is receiving an incoming packet on one of its DTE ports 103 and will transmit the received data to the other DTEs connected to the repeater unit 104'. The received data will also be transmitted on the I/O 302, where it will be received by the integrator 304 and ultimately transmitted to the other repeater units 104' connected to the integrator 304. The Nth data repeater unit 104' is in the RXCOL state if it receives data which has already collided. The data received on the I/O 302 during a received collision is discarded.

The Nth data repeater will be in the TXCOL state when the repeater unit 104' receives a packet from one of its network ports 103 or I/O 302 and while transmitting the received data to other ports, and detects data coming from one or more other network ports 103 other than the port on which it is already receiving data.

The table below shows the relationship between ACTEn and ACTTn and the four states.

|  | READYn | RXINGn | TXCOLn | RXCOLn |
| --- | --- | --- | --- | --- |
| ACTTn | 0 | 0 | 1 | 1 |
| ACTEn | 0 | 1 | 0 | 1 |

Note:
0 indicates that the signal is deasserted.
1 indicates that the signal is asserted.

If the repeater device is an active low device, a low voltage is an assertion of the signal and a high voltage is a deassertion of the signal.

The repeater unit I/O 302 receives from the interface 402 a BNCSn: broadcast network carrier status. In a preferred embodiment of the present invention, the BNCS is in one of four states, according to the network status. These four states are:

1) BNCS=High if all of READYn are high
2) BNCS=Low if only one of the RXINGn is high and all of the RXCOLn and TXCOLn are low.
3) BNCS=20 MHz JAM pattern if one or more than one TXCOLn are high or two or more RXCOLns are high.
4) BNCS=10 Mhz if only one RXCOLn is high and all of the TXCOLn and RXINGn are low.

Figure 6B:
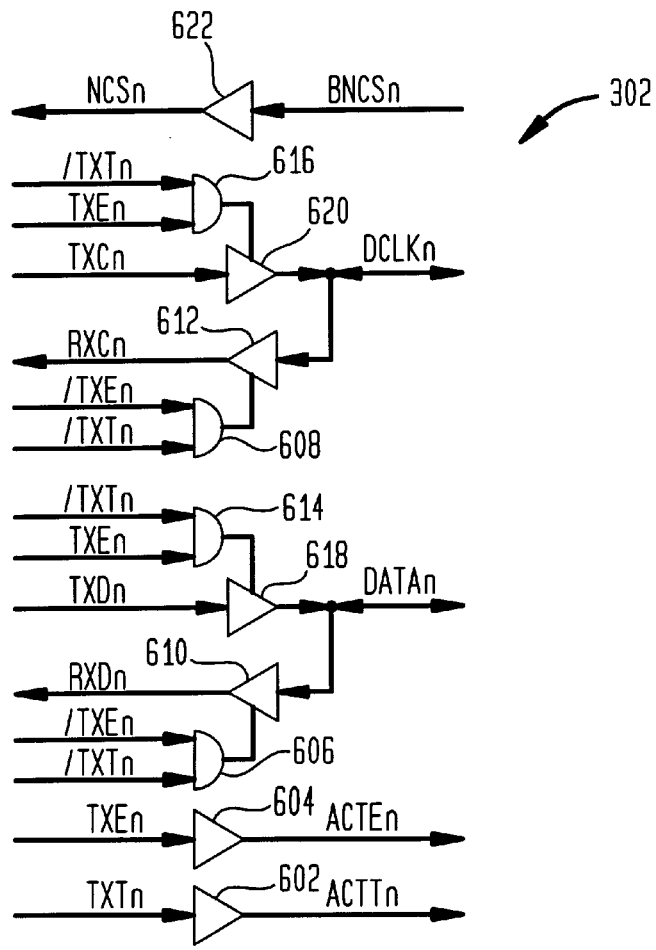
FIG. 6B is a more detailed block diagram of the repeater unit I/O of FIG. 6A.

FIG. 6B is a block diagram illustrating operation of the repeater unit I/O 302. The transmit type (TXTn) signal is passed by a driver 602 and becomes the ACTTn signal. The transmit enable (TXEn) signal is passed by a driver 604 and becomes the ACTEn signal. When TXEn and TXTn are deasserted, the repeater unit 104' is in the READY state (e.g., is ready to receive a transmission) and the output of AND gates 606 and 608 turn on drivers 610, 612. This permits the DATAn and DCLKn signals to be input to the repeater unit as the RXDn and RXCn signals, respectively.

When the TXEn signal is asserted and the TXTn signal is not asserted, the repeater unit is in the RXING state (e.g., it is receiving a transmission from a DTE) and the output of AND gates 614, 616 turn on drivers 618, 620. This allows the TXDn and TXCn signals to be output to the integrator as the DATAn and DCLKn signals, respectively. The BNCSn signal is sent to a driver 622 and sent to the repeater unit 104' as the NCSn signal.

III. The Integrator

A. The Interface I/O, Data flow Controller, and Status Decoder

As seen in FIGS. 4 and 5, the repeater unit/integrator interface 402 includes an interface I/O 404, a data flow controller 406, and a status decoder 408. Each repeater unit/integrator interface 402 is connected to a single repeater unit 104' and thus exchanges information with that repeater unit 104'.

Figure 7:
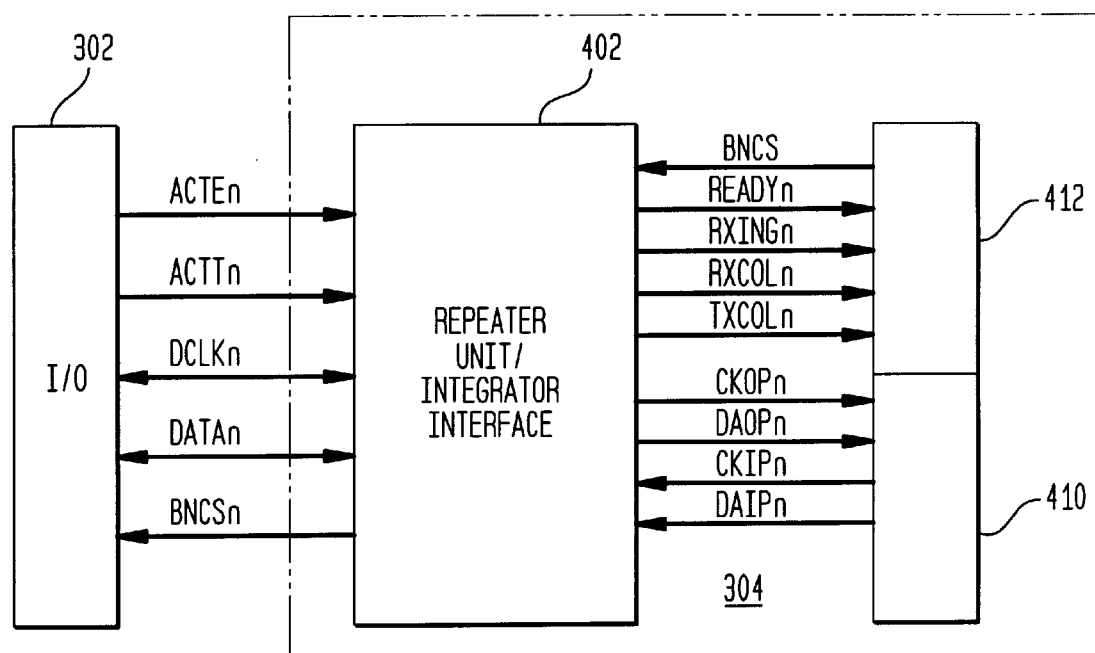
FIG. 7 is a block diagram of a preferred embodiment of a repeater unit/integrator interface.

FIG. 7 is a block diagram of the repeater unit/integrator interface 402 and shows the signals the repeater unit/integrator interface 402 exchanges with the repeater unit I/O 302 and with the data handler 410 and the network status monitor 412.

The signals that the data unit/integrator interface 402 receives from the repeater unit I/O 302 are:

ACTEn: carrier sense enable for repeater unit n

ACCTn: carrier sense type for repeater unit n

The integrator interface 402 sends the BNCSn signal to the repeater unit I/O. As described above, the DCLKn and DATAn lines are bidirectional, depending on whether data is being transmitted from the repeater unit 104' to the integrator 304 or vice versa.

FIG. 7 also shows that the integrator interface 402 sends the following signals to the network status monitor 412:

READYn: repeater unit n is ready to repeat data and timing information

RXINGn: repeater unit n is receiving data from a DTE

RXCOLn: repeater unit n is detecting a receive collision

TXCOLn: repeater unit n is detecting a transmit collision

One of these signals is asserted according to the received and decoded values of ACTEn and ACTTn.

The integrator interface 402 sends the following signals to the data handler 410:

CKOPn: clock output from repeater unit n to be repeated to the other repeater units DAOPn: data output from repeater unit n to be repeated to the other repeater units The data handler 410 sends the following messages to the integrator interface 402:

CKIPn: clock input to be repeated to the DTEs connected to repeater unit n

DAIPn: data input to be repeated to the DTEs connected to repeater unit n

The network status monitor 412 sends the global BNCS signal to the integrator interface 402.

Figure 8:
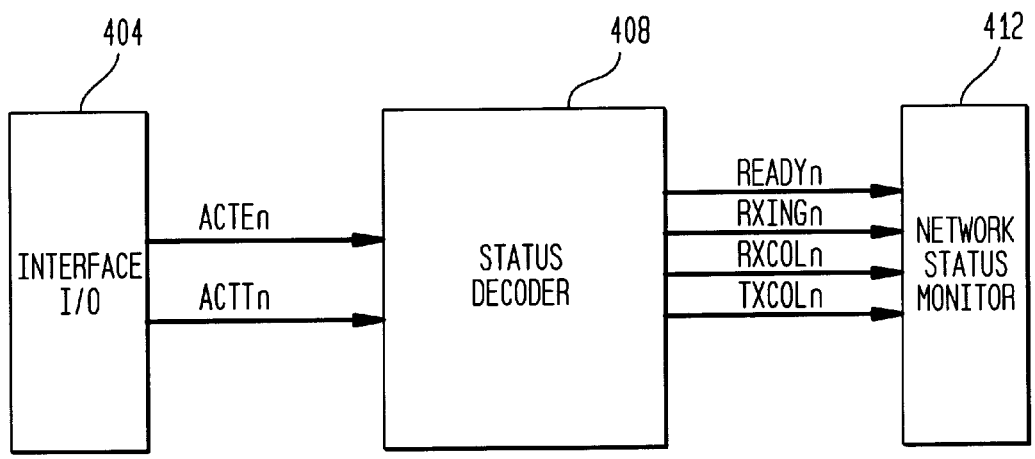
FIG. 8 is a block diagram of a preferred embodiment of a status decoder.

FIG. 8 is a block diagram of the status decoder 408 and shows the signals the status decoder 408 exchanges with the interface I/O 404 and with the network status monitor 412. The interface I/O 404 sends the ACTEn and ACTTn signals to the status decoder 408. The status decoder decodes these signals in the manner described in the table given above. The status determined by the status decoder 408 is provided to the network status monitor 412 by asserting one of the following four signals: READYn, RXINGn, RXCOLn, and TXCOLn.

Figure 9A:
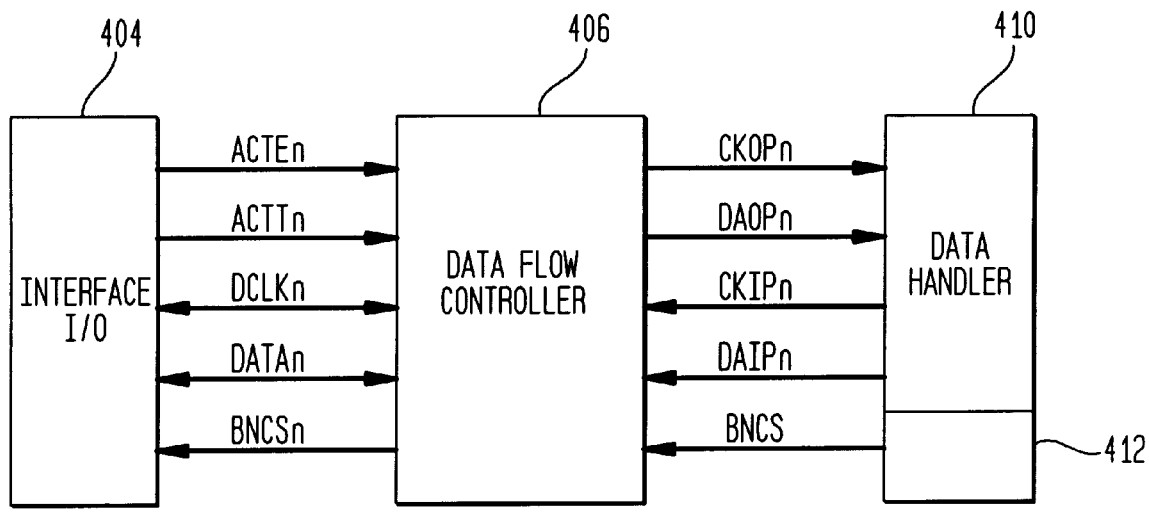
FIG. 9A is a block diagram of a preferred embodiment of a data flow controller.

FIG. 9A is a block diagram of the data flow controller 406 and shows the messages the data flow controller 406 exchanges with the interface I/O 404, with the data handler 410, and with the network status monitor 412. The data flow controller 408 receives from the interface I/O 404 the ACTEn and the ACTTn signals. As discussed in more detail below, these signals are used to control drivers for the DCLKn and DATAn lines to determine the direction in which information will flow on these lines (if at all).

The data flow controller 406 sends to the interface I/O 404 the BNCSn signal. Data flow controller also sends to the data handler 410 the CKOPn and DAOPn signals and receives from the data handler the CKIPn and DAIPn signals. Whether data and timing information is input or output depends on whether the repeater unit 104' attached to the interface 402 is in the READY (to receive data being repeated by the integrator) state or the RXING (transmitting data received from a DTE 102 connected to the repeater unit) state. The data flow controller receives the BNCS signal from the network status monitor. Note that the network status monitor 412 issues a BNCS signal, not a BNCSn signal, because this is the broadcast network carrier status of the entire repeater 300, and is not related to a particular repeater unit 104'.

Figure 9B:
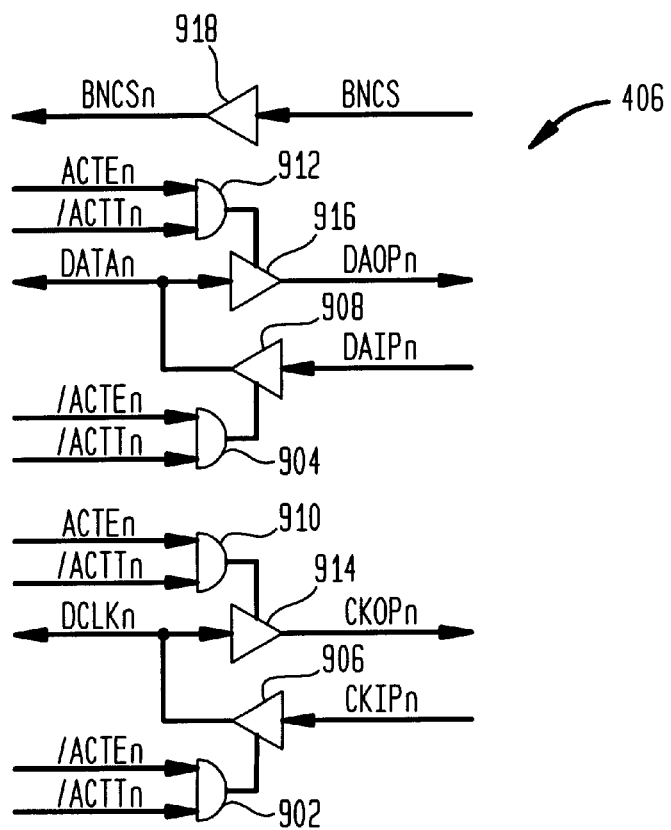
FIG. 9B is a more detailed block diagram of the data flow controller of FIG. 9A.

FIG. 9B is a block diagram illustrating the operation of a preferred embodiment of a data flow controller 406. When ACTEn and ACTTn signals are deasserted, the repeater unit 104' is in the READY state and the output of AND gates 902, 904 turn on drivers 906, 908. This allows CKIPn and DAIPn to be input to repeater unit N. When the ACTEn signal is asserted and the ACTTn signal is deasserted, the outputs of AND gates 910 and 912 turn on drivers 914, 916. This allows DAOPn and CKOPn signals to be output from the repeater unit N 104' to the integrator 304. Any other combination of ACTEn and ACTTn (e.g., when a collision is detected) will not turn on the drivers and data and timing signals will not flow on the DATAn and DCLKn lines. The BNCS signal is sent to a driver 918 and sent to the I/O 302 as a BNCSn.

B. The Data Handler and The Network Status Monitor

Figure 10:
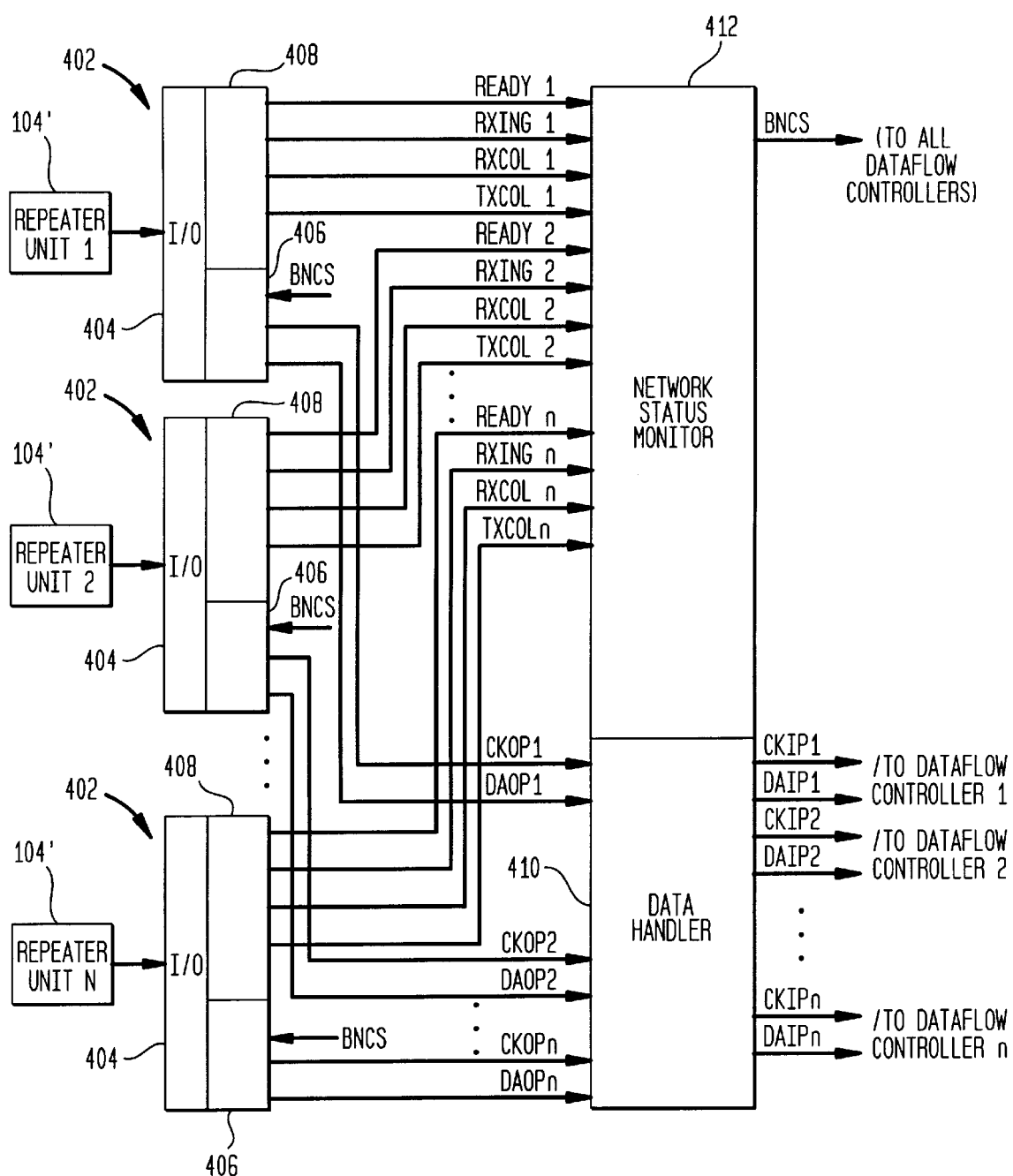
FIG. 10 is a block diagram of preferred embodiments of a network status monitor and a data handler.

FIG. 10 is a block diagram of network status monitor 412 and data handler 410 and shows the signals exchanged between the network status monitor 412 and data handler 410 and the data flow controller 406 and status decoder 408.

As seen in FIG. 10, the network status monitor 412 receives the READY, RXING, RXCOL, and TXCOL signals from each of the repeater units (i.e., repeater units 1, 2, . . . N). Using all of these status signals, the network status monitor determines the broadcast network carrier status signal and generates a BNCS signal. This signal is sent to each data flow controller 406.

Data handler 410 is connected to CKOP and DAOP lines from each data flow controller 406. In the absence of a detected collision, the data handler should receive the clock and data on CKOP and DAOP lines from only a single repeater unit 104' via a data flow controller 406. The data handler 410 repeats the received clock and data to all of the data flow controllers 406, except for the one transmitting the data received by the data handler 410.

Figure 11:
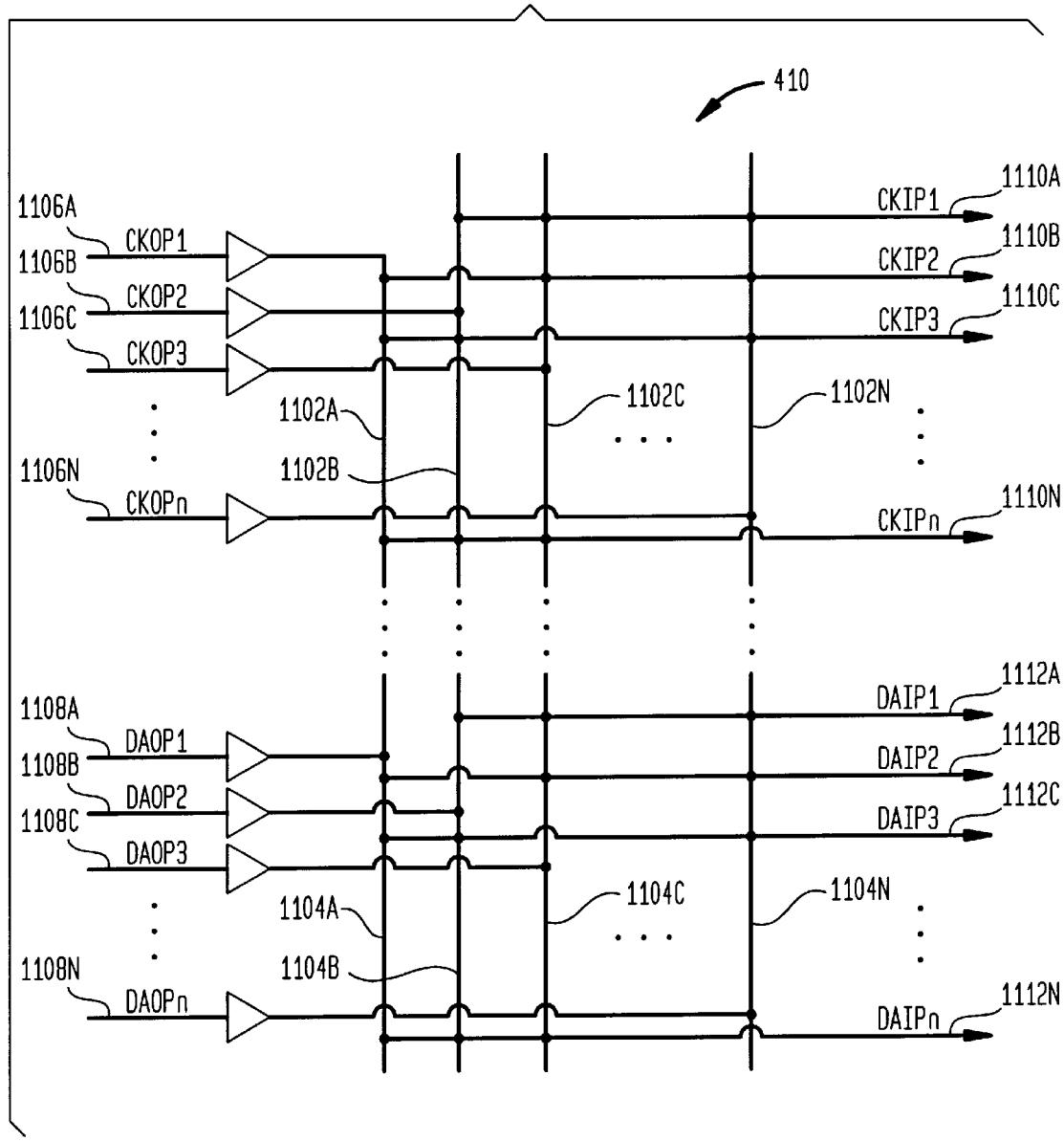
FIG. 11 is a block diagram of the data handler of FIG. 10.

FIG. 11 is a block diagram of a preferred embodiment of a data handler 410 according to a preferred embodiment of the present invention. The data handler 410 is preferably a cross matrix network having N separate clock bus lines 1102A–1102N and N separate data bus lines 1104A–1104N. A single input line 1106A–1106N, 1108A–1108N is connected to each bus line. Input lines 1106A–1106N are each connected to a single clock bus line 1102A–1102N, respectively. Input lines 1108A–1108N are each connected to a single data bus lines 1104A–1104N. Each output line 1110A–1110N, 1112A–1112N is connected to each bus lines, except for the bus line having the same numbering as the input line, i.e., the input line corresponding to the data flow controller to which it will output data and clock. This prevents data and clock information from being feedback to the transmitting repeater unit 104'.

As seen in FIG. 11, a single output line 1110A is connected to the data bus 1102B, 1102C, ... 1102N. A single output line 1110B is connected to the data buses 1102A, 1102C, ... 1102N. A single output line 1110C is connected to the data buses 1102A, 1102B, 1102D, ... 1102N, etc. A single output line 1112A is connected to the clock buses 1104B, 1104C, ... 1104N. A single output line 1112B is connected to the clock buses 1104A, 1104C, 1104C, ... 1104N. A single output line 1112C is connected to the clock buses 1104A, 1104B, 1104D, ... etc. Thus, the output data or the clock signal is connected to all of the data bus or the clock bus that the data bus or the clock bus which has the same numbering as the data or clock input of the matrix network. Thus, the cross matrix network has N clock inputs, N clock outputs, N data inputs, and N data outputs, the inputs and outputs selectively providing data and clock paths.

IV. Timing Diagrams

The operation of an expandable repeater 300 according to a preferred embodiment of the present invention is described with reference to a number of timing diagrams.

Figure 12:
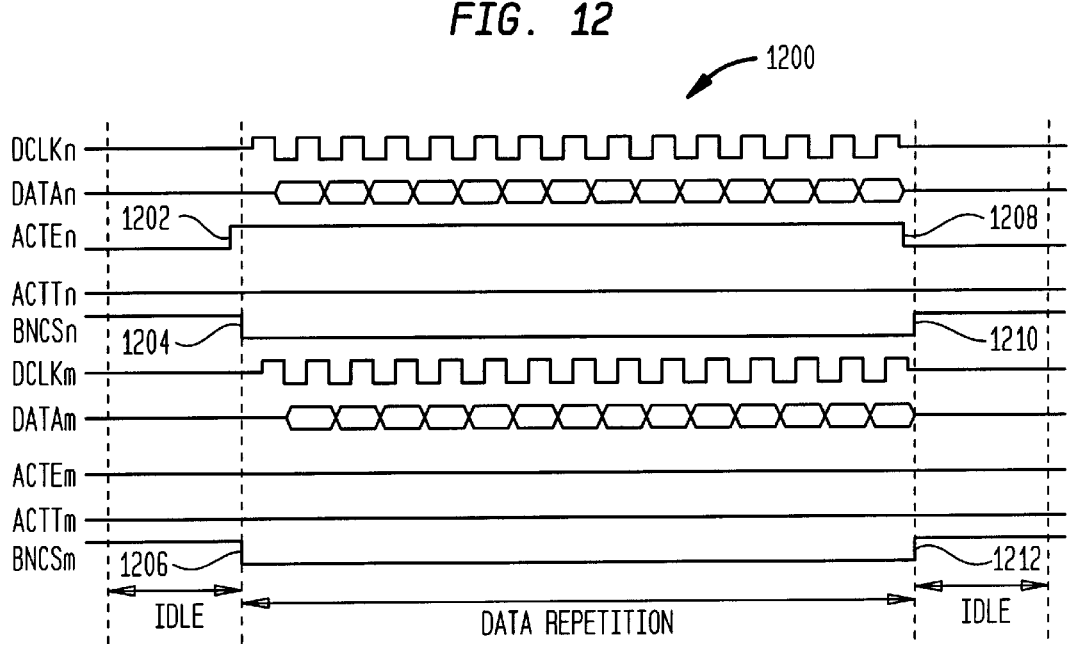

FIG. 12 is a timing diagram 1200 illustrating the operation of the present invention when a repeater unit N receives data from a DTE 102 connected to it and transmits the data to the integrator 304 for the integrator to repeat the data to other repeater units, such as repeater unit M (N≠M). In FIG. 12, repeater unit N begins in the READY state. (Note that ACTEn and ACTTn are deasserted.) A DTE 102 connected to repeater unit N transmits information to the repeater unit and repeater N enters the RXING state 1202. (Note that ACTEn is asserted.) After a brief propagation delay, the global network status (BCNS) for repeaters N and M transition from READY (high) to RXING (low) 1204, 1206. Repeater N transmits clock and data signals from the DTE 102 connected to the integrator 304, which signals are then transmitted to repeater unit M, which, after a brief propagation delay, appears as DCLKm and DATAm signals. After the data has been repeated, repeater N returns to the READY state 1208. The BNCSn and BNCSm signals, after a brief propagation delay, also transition from the RXING state to the READY state 1210, 1212. Note that repeater unit M receives data from the integrator 308, and not from a DTE 102 connected to it, and thus remains in the READY state throughout the data repetition process.

Figure 13:
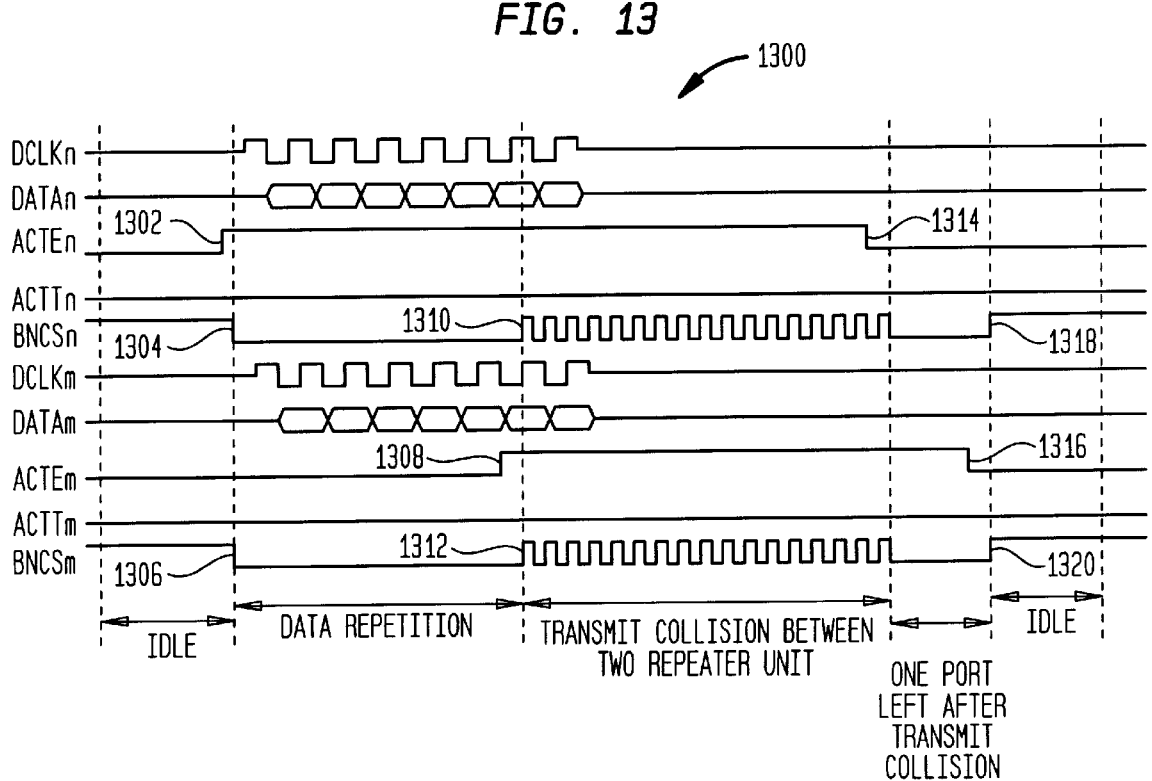

FIG. 13 is a timing diagram 1300 illustrating the operation of the present invention during a first type of transmit collision in which two repeater units N and M both attempt to transmit data to the integrator 304 at the same time. Repeater units N and M begin in the READY state. Note that ACTEn, ACTTn, ACTEm, and ACTTm are all deasserted. When repeater N receives data from a DTE 102 connected to it, it enters the RXING state 1302. (Note that ACTEn is asserted.) After a brief propagation delay, BNCSn and BNCSm transition from high to low 1304, 1306, indicating that the network is in the RXING state. Repeater N receives clock and data signals from a DTE connected to it. After a brief propagation delay, repeater M receives the clock and data transmitted by repeater unit N via the integrator 304.

During the data repetition of the data received from repeater unit N, repeater unit M receives data from a DTE 102 connected to it 1308. (Note ACTEm is asserted 1308, placing the repeater unit M into the RXING state.) Because two different repeater units are receiving data at the same time, a transmit collision occurs in the integrator 304. Thus, after a brief propagation delay after ACTEm is asserted, BNCSn and BNCSm issue a 20 MHz JAM pattern 1310, 1312, indicating a transmit collision between two repeater units. The integrator 304 will not repeat the data and clock on DATAn and DCLKn and never activates the drivers for DATAm and DCLKm. Note that the collision does not occur in the repeater units N or M, but rather in the integrator 304. Thus, neither repeater unit detects the collision, and the ACTEn, ACTTn, ACTEm, and ACTTm signals do not indicate a transmit collision. When repeater unit N's incoming data ends, it leaves the RXING state 1314. After a brief propagation delay, the transmit collision state ends and BNCSn and BNCSm return to the RXING state, because repeater unit M remains in the RXING state. When repeater unit M transitions from the RXING state to the READY state 1316, BNCSn and BNCSm return to the READY state as well 1318, 1320.

Figure 14:
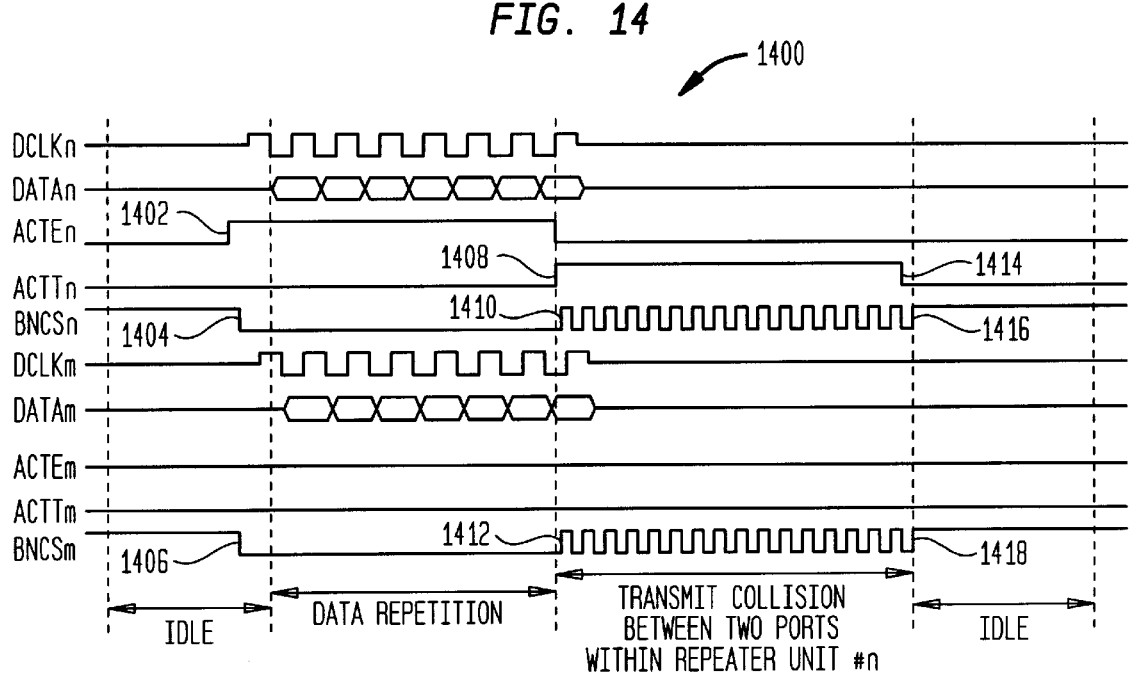

FIG. 14 is a timing diagram 1400 illustrating the operation of the present invention when a transmit collision occurs within the same repeater unit N. Repeater units N and M are in the READY state. Repeater unit N receives a transmission for a DTE 102 connected to it and enters the RXING state. (Note that ACTEn is asserted 1402.) After a brief propagation delay, BNCSn and BNCSm transition from the READY state to the RXING state 1404, 1406. A DTE connected to repeater unit N transmits clock and data to repeater unit N. During this transmission, another DTE 102 connected to repeater unit N also attempts to transmit to the repeater unit. At this time, ACTEn is deasserted and ACTTn is asserted 1408, indicating a transmit collision (TXCOL). After a brief propagation delay, the network status monitor 412 generates a 20 MHz JAM pattern as the BNCSn and BNCSm signals, indicating a transmit collision 1410, 1412. The information DATAn and DCLKn are not repeated while the transmit collision is detected. The data repeater unit M will transmit the JAM pattern onto its network ports 103 to its DTE 102 in response to BNCSm input. After the transmit collision ceases, repeater unit N returns to the READY state 1414. After a brief propagation delay, BNCSn and BNCSm also return to the READY state 1416, 1418.

Figure 15:
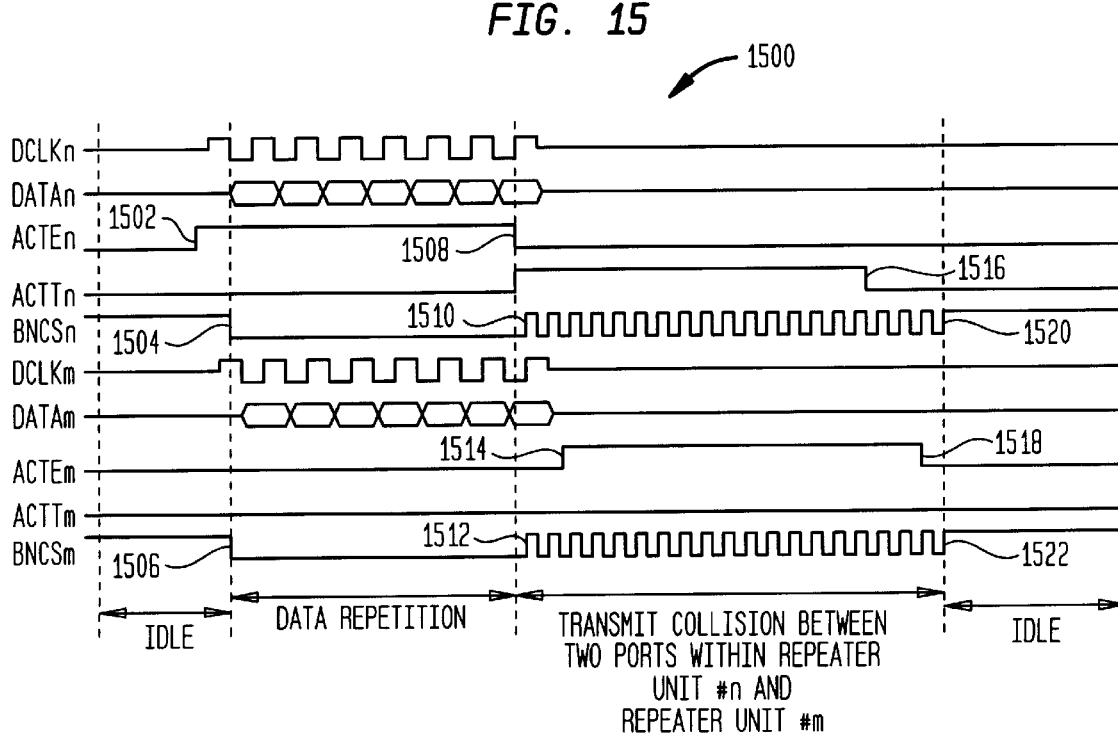

FIG. 15 is a timing diagram 1500 illustrating the operation of the present invention when a transmit collision occurs wherein two ports on repeater unit N and two ports on repeater unit M attempt to transmit at the same time. Repeater units N and M begin in the READY state. A DTE 102 connected to repeater unit N transmits data to repeater unit N. Repeater unit N enters the RXING state 1502. (ACTEn is asserted.) BNCSn and BNCSm transition from the READY state to the RXING state 1504, 1506. Repeater unit N receives clock information and data from a DTE 102 connected to it. During reception of this data and clock, another DTE connected to repeater unit N attempts to transmit. At this time, ACTEn is deasserted and ACTTn is asserted 1508, indicating a transmit collision (TXCOL). The network status monitor 412 generates a 20 MHz JAM pattern as the BNCSn and BNCSm signals, indicating a transmit collision 1510, 1512. During the transmit collision signal, a DTE 102 connected to repeater unit M attempts to transmit to repeater unit M. ACTTm is asserted 1514, indicating the repeater unit M is in the TXCOL state. Because the global network status already indicates a transmit collision, the BNCSn and BNCSm signals do not change. When the repeater unit N returns to the READY state 1516, repeater unit M is still in the TXCOL state and therefore BNCSn and BNCSm signals remain in the transmit collision state. When repeater unit M returns to the READY state 1518, after a brief propagation delay, BNCSn and BNCSm return to the READY state 1520, 1522.

FIG. 16 is a timing diagram 1600 illustrating the operation of the present invention when two repeater units experience a receive collision state at the same time. Repeater units N and M begin in the READY state. Repeater unit N detects a receive collision 1602. The network status monitor 412 generates a 10 MHz signal as the BNCSn and BNCSm 1604, 1606, indicating a receive collision state (RXCOL). During this receive collision state, repeater unit M also detects a receive collision 1608. Because two receive collision states are detected, the network status monitor generates a 20 MHz JAM pattern as the BNCSn and BNCSm signals 1610, 1612. When one of the repeater units ceases detecting a receive collision 1614, only a single receive collision state exists and BNCSn and BNCSm return to the 10 MHz RXCOL signal 1616, 1618. When the final receive collision state ceases 1620, BNCSn and BNCSm return to the READY state 1622, 1624.

FIG. 17 is timing diagram 1700 illustrating the operation of the present invention when a receive collision occurs within a single repeater unit N. Repeater units N and M begin in the READY state. A DTE 102 connected to repeater unit N begins to transmit and repeater unit N enters the RXING state 1702. (ACTEn is asserted.) BNCSn and BNCSm transition from the READY state to the RXING state 1704, 1706. Data and clock are transmitted from the DTE to repeater unit N. Repeater unit N transmits the data and clock to the integrator 304 which retransmits the data and clock to other repeater units, such as repeater unit M. During the transmission of this data, repeater unit N receives data from the integrator 304 and ACTTn is asserted and repeater unit N enters the RXCOL state 1708. The network status monitor 412 generates a 10 MHz signal as the BNCSn and BNCSm signal indicating that the network is in RXCOL 1710, 1712. When repeater unit N leaves the RXCOL state 1714, BNCSn and BNCSm transition from the RXCOL state to the READY state 1716, 1718.

V. Conclusion

An expandable repeater is disclosed which comprises of a number of repeater units connected to an integrator. A repeater unit may be a single monolithic integrated circuit. Each repeater unit may be connected to a central integrator and provide network status information, and data and clock information to the integrator. The integrator may provide network status information, and data and clock information to the repeater units. The integrator coordinates the repeater units in a manner which allows them to operate as a single repeater under the IEEE 802.3 Standard, thus allowing a greater number of DTEs to be connected to a single repeater. Moreover, the expandable repeater requires no request and acknowledge signals to transmit to the integrator.

The above described embodiments of the invention are intended to be illustrative only. Numerous alternative embodiments may be devised by those skilled in the art without departing from the spirit and scope of the following claims.

I claim:

1. An expandable repeater integrator for coordinating a plurality of repeater units, each repeater unit being configured for connection to at least one data terminal and having a repeater unit input/output (I/O), the repeater unit I/O configured to transmit and receive data, timing, and status information, the integrator comprising:

a. a plurality of repeater unit/integrator interfaces, each interface connected to one of the plurality of repeater unit I/Os and configured to exchange data, timing, and status information with the repeater unit I/O;

b. a network status monitor configured to receive status information from each repeater unit/integrator interface, to generate a global network status signal, and to transmit the global network status information to each repeater unit/integrator interface; and c. a data handler configured to receive from one of the plurality of interfaces data and timing information, and to transmit to the other of the plurality of repeater unit/integrator interfaces the received data and timing information;

wherein the plurality of repeater units operate as a single repeater.

2. The integrator of claim 1, wherein the repeater unit/integrator interfaces further comprise:

a. an interface I/O connected to the repeater unit I/O;

b. a status decoder connected to the interface I/O and the network status monitor; and c. a data flow controller connected to the interface I/O, the data handler, and the network status monitor.

3. The integrator of claim 2, wherein the interface I/O is configured to receive status information from the repeater unit I/O.

4. The integrator of claim 2, wherein the interface I/O is configured to provide data, timing, and status information to the repeater unit I/O and the data flow controller, and to provide status information to the status decoder.

5. The integrator of claim 4, wherein the status decoder is configured to decode the status information received from the interface I/O and to assert to the network status monitor a decoded status signal.

6. The integrator of claim 4, wherein the data flow controller is configured selectively to receive output data and timing information from the interface I/O and to transmit the output data and timing information to the data handler and to receive input data and timing information from the data handler and transmit the input data to the interface I/O.

7. The integrator of claim 4, wherein the data flow controller is configured to receive status information from the interface I/O, to receive the global network status information signal from the network status monitor, and to transmit the global network status information signal to the interface I/O.

8. The integrator of claim 1, wherein the plurality of repeater units are connected to the integrator in a star topology.

9. The integrator of claim 1, wherein the global network status information is a single signal which may be in one of four states to indicate a global network status.

10. The integrator of claim 1, wherein the data handler comprises a cross matrix network selectively providing routes for the data and timing information.

11. The integrator of claim 1, wherein the data is clocked with the timing information.

12. The integrator of claim 11, wherein the data may be transmitted asynchronously to the plurality of repeater units.

13. The integrator of claim 1, wherein the plurality of repeater units comprises monolithic integrated circuit repeater units.

14. The integrator of claim 1, wherein the plurality of repeater units perform IEEE 802.3 Standard machine state functions.

15. A method for coordinating a plurality of repeater units to operate as a single repeater unit, the method comprising the steps of:

a. receiving a repeater unit status signal from each of the plurality of repeater units;

b. in response to the repeater unit status signal, generating a broadcast network carrier signal;

c. transmitting the broadcast network carrier signal to the plurality of repeater units;

d. receiving a first transmission from one of the plurality of repeater units;

e. repeating the first transmission to other of the plurality of repeater units;

f. detecting a collision if a second transmission is received during one of receipt of the first transmission and repeat of the first transmission; and g. discarding the first and second transmissions when a collision is detected.

16. The method of claim 15, wherein the step of receiving the repeater unit status signal further includes receiving one of:

a. a ready state signal indicating the repeater unit is ready to receive a transmission;

b. a receive state signal indicating the repeater unit is receiving a transmission;

c. a receive collision state signal indicating the repeater unit is detecting a receive collision; and d. a transmit collision state signal indicating the repeater unit is detecting a transmit collision.

17. The method of claim 15, wherein the step of generating a broadcast network carrier signal further comprises the steps of:

a. generating a first signal if a ready state signal is received from each repeater unit;

b. generating a second signal if a receive state signal is received from one repeater unit and no receiver collision state signal and no transmit collision state signal is received;

c. generating a third signal if at least one transmit collision state signal is received; and d. generating a fourth signal of one receive transmit collision state signal is received and no transmit collision state signal is received.

* * * * *